United States Patent
Kim et al.

(10) Patent No.: US 10,078,823 B2
(45) Date of Patent: Sep. 18, 2018

(54) POS PERIPHERALS CONTROLLING DEVICE, MOBILE HOST DEVICE, AND CONTROL METHOD THEREOF

(71) Applicant: BIXOLON CO., LTD., Seongnam-si, Gyeonggi-do (KR)

(72) Inventors: Ji Hwan Kim, Anyang-si (KR); Won Je Choi, Seongnam-si (KR); Sa Bin Son, Suwon-si (KR); Cho Eun Jeong, Seongnam-si (KR)

(73) Assignee: BIXOLON CO., LTD., Seongnam-si (KR)

( * ) Notice: Subject to any disclaimer, the term of this patent is extended or adjusted under 35 U.S.C. 154(b) by 83 days.

(21) Appl. No.: 15/118,092

(22) PCT Filed: Dec. 2, 2014

(86) PCT No.: PCT/KR2014/011700
§ 371 (c)(1),
(2) Date: Aug. 10, 2016

(87) PCT Pub. No.: WO2015/122608
PCT Pub. Date: Aug. 20, 2015

(65) Prior Publication Data
US 2016/0364710 A1    Dec. 15, 2016

(30) Foreign Application Priority Data
Feb. 11, 2014    (KR) .......................... 10-2014-0015203

(51) Int. Cl.
*G06Q 20/20*    (2012.01)
*G06F 13/10*    (2006.01)
(Continued)

(52) U.S. Cl.
CPC ........... *G06Q 20/20* (2013.01); *G06F 13/102* (2013.01); *G06Q 20/209* (2013.01);
(Continued)

(58) Field of Classification Search
CPC .... G06F 13/102; G06Q 20/20; G06Q 20/209; G07G 1/12
See application file for complete search history.

(56) References Cited

U.S. PATENT DOCUMENTS

2005/0261969 A1* 11/2005 Dimmock ............. G06F 13/102
   705/16
2009/0037284 A1* 2/2009 Lewis .................... G06Q 20/20
   705/16

(Continued)

FOREIGN PATENT DOCUMENTS

EP    2 645 343 A2    10/2013
JP    2012-027633 A    2/2012

(Continued)

OTHER PUBLICATIONS

KR Notice of Allowance dated Jul. 2, 2015 as received in Application No. 10-2014-0015203.
(Continued)

*Primary Examiner* — Glenn A. Auve
(74) *Attorney, Agent, or Firm* — Maschoff Brennan

(57) ABSTRACT

Provided is a POS peripherals controlling device including: a wireless communication unit; an interface part including at least one interface unit; and a controller determining whether data received from a mobile POS host device through the wireless communication unit includes control data for controlling at least one POS peripheral connected through the interface part, when the received data includes control data, checking a target POS peripheral where the control data is to be delivered among the at least one peripheral, and transmitting control data included in the received data to the checked POS peripheral through a first interface unit connected to the checked target peripheral among the at least one interface unit, wherein the control data is generated by the mobile POS host device and is
(Continued)

generated in a format corresponding to the target peripheral that is to receive the control data.

13 Claims, 9 Drawing Sheets

(51) Int. Cl.
    *H04W 4/00*     (2018.01)
    *H04W 4/80*     (2018.01)
    *G07G 1/00*     (2006.01)
    *G07G 1/12*     (2006.01)

(52) U.S. Cl.
    CPC ......... *G07G 1/0009* (2013.01); *G07G 1/0018* (2013.01); *G07G 1/12* (2013.01); *H04W 4/008* (2013.01); *H04W 4/80* (2018.02)

(56) References Cited

U.S. PATENT DOCUMENTS

| | | | |
|---|---|---|---|
| 2012/0066079 A1 | 3/2012 | Falzone et al. | |
| 2012/0185306 A1* | 7/2012 | Cheng | G06Q 20/209 705/14.4 |
| 2013/0318145 A1 | 11/2013 | Nishimura | |
| 2014/0019274 A1 | 1/2014 | Hardin et al. | |
| 2015/0287010 A1* | 10/2015 | Hasegawa | G06Q 20/20 705/21 |
| 2015/0332238 A1 | 11/2015 | Shin | |
| 2017/0228713 A1* | 8/2017 | Nichols | G06Q 20/20 |

FOREIGN PATENT DOCUMENTS

| | | |
|---|---|---|
| JP | 2013-242802 A | 12/2013 |
| KR | 10-2007-0052988 A | 5/2007 |
| KR | 10-2013-0115589 A | 10/2013 |
| KR | 10-2013-0143107 A | 12/2013 |

OTHER PUBLICATIONS

Extended European Search Report dated Jul. 10, 2017 as received in Application No. 14882499.8.

* cited by examiner

POS PERIPHERALS CONTROLLING DEVICE, MOBILE HOST DEVICE, AND CONTROL METHOD THEREOF

TECHNICAL FIELD

The present disclosure relates to a Point-Of-Sales (POS) peripherals controlling device for controlling a POS peripheral, a mobile host device, and a control method thereof.

BACKGROUND ART

In general, a POS system refers to a POS management system containing a teller registration function and a computer function.

When such a POS system is used, it is possible to grasp the flow of sales of goods by each unit item, and furthermore, it is possible to grasp in detail the sales trends and time slots of new and promotional goods, sales sluggish goods, and the sales trends of similar goods or competing goods. Therefore, it is possible to effectively establish marketing strategies such as relationships between selling prices and sales volumes, main attack targets, and advertisement plans.

Such a POS system may be configured typically including a server for supporting a POS and a POS terminal for performing various POS function in connection with the server. In general, a POS function may include functions for collecting/processing a variety of information and materials necessary for product management, payment processing, sales amount calculation processing, and store or shop management. Moreover, various POS peripherals (for example, barcode readers, receipt printers, card payment signature pads, cash drawers, and so on) may be connected to a POS terminal. At this point, the POS terminal may have a function for controlling the POS peripherals.

In relation to such a typical POS system, POS terminals may be in PC forms or POS peripherals may be integrally combined with a POS terminal in most cases. Although studies on using electronic devices such as tablet PCs or smartphones having portability and computing capability similar to that of an existing PC as POS terminals are in progress recently, there are interface issues between electronic devices such as tablet PCs or smartphones and POS peripherals. Thus, it is difficult to actually use electronic devices such as tablet PCs or smartphones as POS terminals.

DISCLOSURE

Technical Problem

The present disclosure provides a POS peripherals controlling device for controlling POS peripherals, and more particularly, to a POS peripherals controlling device for easily using electronic devices such as tablet PCs or smartphones as a POS terminal (for example, a host device).

The present disclosure also provides a POS peripheral controlling method for controlling POS peripherals.

The present disclosure also provides a mobile host device for controlling POS peripherals.

The present disclosure also provides a mobile host controlling method for easily controlling POS peripherals.

Technical Solution

According to one aspect of the present invention, a POS peripherals controlling device includes: a wireless communication unit; an interface part including at least one interface unit; and a controller determining whether data received from a mobile POS host device through the wireless communication unit includes control data for controlling at least one POS peripheral connected through the interface part, when the received data includes control data, checking a target POS peripheral where the control data is to be delivered among the at least one peripheral, and transmitting control data included in the received data to the checked POS peripheral through a first interface unit connected to the checked target peripheral among the at least one interface unit, wherein the control data is generated by the mobile POS host device and is generated in a format corresponding to the target peripheral that is to receive the control data.

At this point, the wireless communication unit may communicate data through at least one wireless communication method of Wifi, Bluetooth, ZigBee, WiGig, Radio Frequency Identification (RFID), infrared Data Association (IrDA), Ultra Wideband (UWB), and WiHD.

The interface part may include at least one of a USB port, a serial port, and a parallel port.

The interface part may communicate data through at least one wireless communication method of Wifi, Bluetooth, ZigBee, WiGig, Radio Frequency Identification (RFID), infrared Data Association (IrDA), Ultra Wideband (UWB), and WiHD.

At this point, the data may includes a first part representing whether the data includes the control data, a second part representing identification information of the target POS peripheral where the control data is to be transmitted, and a third part including the control data. At this point, the third part may include size information representing a size of the control data and the control data.

The controller may determine whether the received data includes the control data on the basis of a first part included in the data and representing whether the data includes the control data.

The controller may check the target POS peripheral on the basis of a second part included in the data and representing identification information of the target POS peripheral.

The controller may extract the control data to be transmitted to the target POS peripheral from the received data on the basis of a third part included in the data and including size information representing a size of the control data and the control data.

According to another aspect of the present invention, a POS peripherals controlling device includes: a wireless communication unit; an interface part including at least one interface unit; and a controller for receiving data from a first POS peripheral through the interface part, obtaining identification information of the first POS peripheral, generating data for host transmission including the identification information and the received data, and transmitting the generated data for host transmission to a mobile POS host device through the wireless communication unit, wherein the data for host transmission further includes transmission information representing that data received by the mobile POS host device is transmitted from a POS peripheral.

The controller may check a first interface unit connected to the first POS peripheral among the at least one interface unit and obtain identification information of the first POS peripheral on the basis of the checked first interface unit.

The POS peripherals controlling device may further include a memory unit for matching and storing the at least one interface unit and identification information of at least one POS peripheral connected to each of the at least one interface unit, wherein the controller may obtain identification information of the first POS peripheral by checking the memory unit.

At this point, when one of the at least one POS peripheral is connected to one of the at least one interface unit, the controller may match and store identification information of the connected POS peripheral and information on the connected interface unit in the memory.

The controller may receive identification information of the first POS peripheral together with the data from the first POS peripheral.

According to another aspect of the present invention, provided is a control method of a mobile host device that is wirelessly connected to a POS peripherals controlling device that is connected to at least one POS peripheral. The method includes: receiving a control signal for controlling a first POS peripheral among the at least one POS peripheral from an application program or Operating System (OS); generating control data having a format corresponding to the first POS peripheral on the basis of the control signal through a first unit corresponding to the first POS peripheral among at least one control unit; obtaining identification information of the first POS peripheral; generating data for controller transmission including the generated control data, the obtained identification information, and information representing data for controller transmission; and transmitting the generated data for controller transmission to the POS peripherals controlling device.

At this point, the data for controller transmission may further include size information representing a size of the control data.

The method may further include receiving identification information of the at least one POS peripheral from the POS peripherals controlling device.

According to another aspect of the present invention, provided is a control method of a mobile host device that is wirelessly connected to a POS peripherals controlling device that is connected to at least one POS peripheral. The method includes: receiving data from the POS peripherals controlling device; determining whether the received data includes peripheral data transmitted from the at least one POS peripheral; when the received data includes the peripheral data, checking a source POS peripheral that transmits the peripheral data; and processing the peripheral data through a first unit corresponding to the checked source POS peripheral among at least one control unit.

The method may further include transmitting a processing result of the peripheral data to an application program or Operating System (OS).

At this point, the data may include a first part representing whether the data includes the peripheral data, a second part representing identification information of the source POS peripheral, and a third part including the peripheral data.

Advantageous Effects

According to the present invention, the following effects occur.

First, as a host device is indirectly connected to POS peripherals through a POS peripherals controlling device without being directly connected to all POS peripherals, the host device may control a plurality of POS peripherals even if being connected to only the POS peripherals controlling device 100, so that it is possible to control a plurality of POS peripherals.

Second, as a host device is connected to the POS peripherals controlling device to control POS peripherals, without a specific hardware design change or a special hardware component addition for an existing smartphone and/or a tablet PC, it is possible to operate as a host device for controlling POS peripherals.

Third, without a specific hardware design change or a software design change for existing POS peripherals and/or a special hardware component or software component addition for existing POS peripherals, it is possible to communicate a POS peripherals controlling device through a method identical to a method of communicating with an existing host device, and as a POS peripherals controlling device according to an embodiment of the present invention properly serves as an intermediate role between a POS peripheral and a host device, even when an existing smartphone and/or a tablet PC is used as a host device, it is possible to communicate with various kinds of POS peripherals.

BEST MODE

Figure 1:
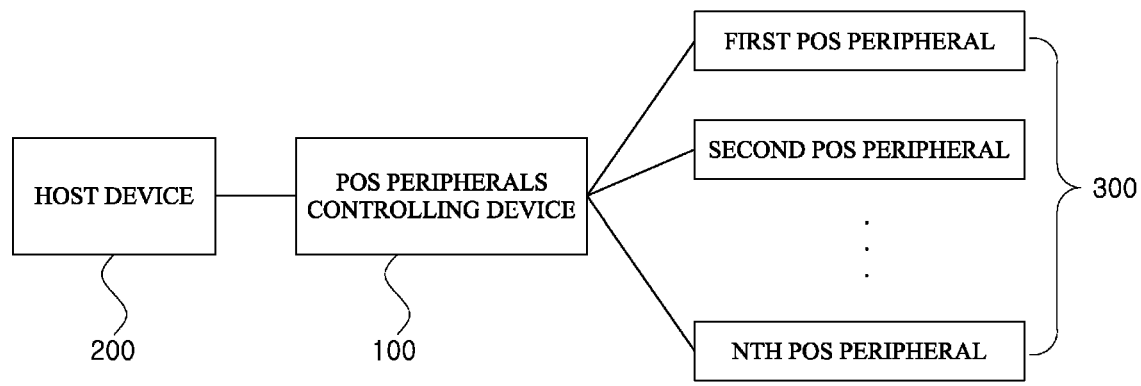
FIG. 1 is a view illustrating an operating environment according to an embodiment of the present invention.

According to one aspect of the present invention, a POS peripherals controlling device includes: a wireless communication unit; an interface part including at least one interface unit; and a controller determining whether data received from a mobile POS host device through the wireless communication unit includes control data for controlling at least one POS peripheral connected through the interface part, when the received data includes control data, checking a target POS peripheral where the control data is to be delivered among the at least one peripheral, and transmitting control data included in the received data to the checked POS peripheral through a first interface unit connected to the checked target peripheral among the at least one interface unit, wherein the control data is generated by the mobile POS host device and is generated in a format corresponding to the target peripheral that is to receive the control data.

At this point, the wireless communication unit communicates data through at least one wireless communication method of Wifi, Bluetooth, ZigBee, WiGig, Radio Frequency Identification (RFID), infrared Data Association (IrDA), Ultra Wideband (UWB), and WiHD.

The interface part includes at least one of a USB port, a serial port, and a parallel port.

The interface part communicates data through at least one wireless communication method of Wifi, Bluetooth, ZigBee, WiGig, Radio Frequency Identification (RFID), infrared Data Association (IrDA), Ultra Wideband (UWB), and WiHD.

At this point, the data includes a first part representing whether the data includes the control data, a second part representing identification information of the target POS peripheral where the control data is to be transmitted, and a third part including the control data. At this point, the third part includes size information representing a size of the control data and the control data.

The controller determines whether the received data includes the control data on the basis of a first part included in the data and representing whether the data includes the control data.

The controller checks the target POS peripheral on the basis of a second part included in the data and representing identification information of the target POS peripheral.

The controller extracts the control data to be transmitted to the target POS peripheral from the received data on the basis of a third part included in the data and including size information representing a size of the control data and the control data.

According to another aspect of the present invention, a POS peripherals controlling device includes: a wireless communication unit; an interface part including at least one interface unit; and a controller for receiving data from a first POS peripheral through the interface part, obtaining identification information of the first POS peripheral, generating data for host transmission including the identification information and the received data, and transmitting the generated data for host transmission to a mobile POS host device through the wireless communication unit, wherein the data for host transmission further includes transmission information representing that data received by the mobile POS host device is transmitted from a POS peripheral.

The controller checks a first interface unit connected to the first POS peripheral among the at least one interface unit and obtains identification information of the first POS peripheral on the basis of the checked first interface unit.

The POS peripherals controlling device further includes a memory unit for matching and storing the at least one interface unit and identification information of at least one POS peripheral connected to each of the at least one interface unit, wherein the controller obtains identification information of the first POS peripheral by checking the memory unit.

At this point, when one of the at least one POS peripheral is connected to one of the at least one interface unit, the controller matches and stores identification information of the connected POS peripheral and information on the connected interface unit in the memory.

The controller receives identification information of the first POS peripheral together with the data from the first POS peripheral.

According to another aspect of the present invention, provided is a control method of a mobile host device that is wirelessly connected to a POS peripherals controlling device that is connected to at least one POS peripheral. The method includes: receiving a control signal for controlling a first POS peripheral among the at least one POS peripheral from an application program or Operating System (OS); generating control data having a format corresponding to the first POS peripheral on the basis of the control signal through a first unit corresponding to the first POS peripheral among at least one control unit; obtaining identification information of the first POS peripheral; generating data for controller transmission including the generated control data, the obtained identification information, and information representing data for controller transmission; and transmitting the generated data for controller transmission to the POS peripherals controlling device.

At this point, the data for controller transmission further includes size information representing a size of the control data.

The method further includes receiving identification information of the at least one POS peripheral from the POS peripherals controlling device.

According to another aspect of the present invention, provided is a control method of a mobile host device that is wirelessly connected to a POS peripherals controlling device that is connected to at least one POS peripheral. The method includes: receiving data from the POS peripherals controlling device; determining whether the received data includes peripheral data transmitted from the at least one POS peripheral; when the received data includes the peripheral data, checking a source POS peripheral that transmits the peripheral data; and processing the peripheral data through a first unit corresponding to the checked source POS peripheral among at least one control unit.

The method further includes transmitting a processing result of the peripheral data to an application program or Operating System (OS).

At this point, the data includes a first part representing whether the data includes the peripheral data, a second part representing identification information of the source POS peripheral, and a third part including the peripheral data.

Mode for Invention

The objects, features, and advantages of the present invention become more apparent from the following detailed description with reference to the accompanying drawings. However, various modifications are possible in various embodiments of the present invention and thus, specific embodiments are illustrated in drawings and related detailed descriptions are listed.

In the accompanying drawings, the thicknesses of layers and areas are exaggerated for clarity and also, it will be understood that when an element or a layer is referred to as being "on" another element or layer, it may be directly on the other element or intervening elements may also be present. The same reference numerals denote the same elements in principle throughout the specification.

Additionally, detailed descriptions of well-known functions or configurations will be omitted since they would obscure the present invention in unnecessary detail. Additionally, numbers (for example, first and second) used in the description of this specification are just identification symbols for distinguishing one component from another component.

Hereinafter, an electronic device according to the present invention will be described in detail with reference to the accompanying drawings. The suffixes "module" and "unit" for components used in the description below are assigned or mixed in consideration of easiness in writing the specification and do not have distinctive meanings or roles by themselves.

Electronic devices described in this specification may include fixed terminals such as digital TVs and desktop computers in addition to mobile terminals such as smartphones, laptop computers, digital broadcast terminals, personal digital assistants (PDAs), portable multimedia players (PMPs), and navigation systems.

FIG. 1 is a view illustrating an operating environment according to an embodiment of the present invention.

Referring to FIG. 1, a Point-Of-Sales (POS) peripherals controlling device 100 according to an embodiment of the present invention may be connected to a host device 200 and at least one POS peripheral 300.

The host device 200 may be an electronic device such as a desktop computer, a laptop computer, a tablet, and a smartphone. The host device 200 may communicate with the POS peripherals controlling device 100. The host device 200 and the POS peripherals controlling device 100 are not limited thereto and may communicate with each other through a wireless communication method. The host device 200 may receive various user inputs for controlling the POS peripherals 300 from a user and process them, and also may generate a command for controlling the POS peripherals 300. Moreover, the host device 200 may transmit the generated command to the POS peripherals controlling device 100.

The POS peripherals controlling device 100 according to an embodiment of the present invention may communicate with the host device 200 and moreover, may communicate with at least one POS peripheral 300. The host device 200 and the POS peripherals controlling device 100 are not limited thereto and may communicate with each other through a wireless communication method. The POS peripherals controlling device 100 and the at least one POS peripheral 300 are not limited thereto and may communicate with each other through a wired communication method. The POS peripherals controlling device 100 according to an embodiment of the present invention may transmit various commands, which are received from the host device 200, to the POS peripheral 300 to which the commands are to be transmitted. Moreover, various data received from the POS peripherals 300 may be transmitted to the host device 200.

At least one POS peripheral 300 may be an electronic device such as a code scanner, a printer, a card payment signature pad, and a card reader for reading one-dimensional code such as cash drawer and barcode and/or two-dimensional code such as QR code or color code. The at least one POS peripheral 300 may communicate with the POS peripherals controlling device 100. The POS peripherals controlling device 100 and the at least one POS peripheral 300 are not limited thereto and may communicate with each other through a wired communication method. At least one POS peripheral 300 may perform a necessary operation on the basis of a received command and furthermore, may generate various data such as data for reporting a result of an operation performance to the host device 200 and data for notifying current state information to the host device 200 and transmit it to the POS peripherals controlling device 100.

When an electronic device in an existing desktop form is used as a host device, the host device may include a wired interface part connectible to POS peripherals but since electronic devices having excellent portability and mobility do not include a sufficient wired interface part connectible to POS peripherals, it is impossible to use a tablet PC or a smartphone as a host device.

Of course, when, a wireless communication module such as WiFi-Direct or Bluetooth is employed to POS peripherals, it may be used as a host device for controlling POS peripherals through a wireless communication method by using a tablet PC or a smartphone. However, in such a case, in order to use a plurality of POS peripherals by using a tablet PC or a smartphone, since it requires a cumbersome procedure, for example, Bluetooth pairing is performed again for controlling another POS peripheral while controlling one POS peripheral, users feel even more uncomfortable in comparison to a case that an electronic device in an existing desktop form is used as a host device.

The POS peripherals controlling device 100 according to an embodiment of the present invention may include a wireless communication unit for communicating with an electronic device having excellent portability and mobility such as a tablet PC or a smartphone, through a wireless communication method. On the other hand, the POS peripherals controlling device 100 according to an embodiment of the present invention may sufficiently include a wired interface part such as USB port, which is wiredly connected to the various POS peripherals 300.

Accordingly, when an electronic device having excellent portability and mobility such as a tablet PC or a smartphone is used as the host device 200, the host device 200 may transmit various commands necessary for a control of the POS peripherals 300 to the POS peripherals 200 in connection with only the POS peripherals controlling device 100 and the POS peripherals controlling device 100 connected to various POS peripherals 300 may identify the POS peripherals 300 to which a corresponding command is to be transmitted and transmit a received command. Therefore, it is possible to solve the conventional issues.

That is, as the host device 200 is indirectly connected to the POS peripherals 300 through the POS peripherals controlling device 100 without being directly connected to the all POS peripherals 300, the host device 200 may control the plurality of POS peripherals 300 even if being connected to only the POS peripherals controlling device 100, so that it is possible to solve the conventional issues.

Hereinafter, a configuration of the POS peripherals controlling device 100 and a control method thereof will be described in more detail according to an embodiment of the present invention.

Figure 2:
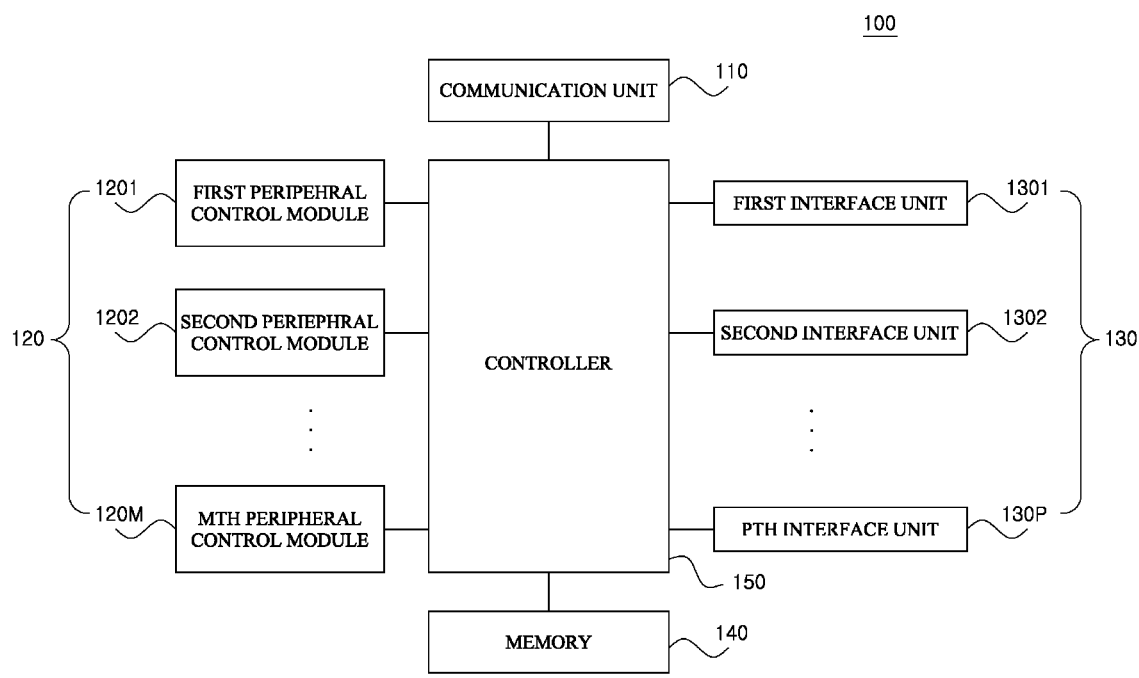
FIG. 2 is a block diagram of a POS peripherals controlling device according to an embodiment of the present invention.

FIG. 2 is a block diagram of a POS peripherals controlling device according to an embodiment of the present invention.

A POS peripherals controlling device 100 according to an embodiment of the present invention may include a communication unit 110, at least one peripheral controlling module 120, an interface part 130, a memory 140, and a controller 150. Components shown in FIG. 2 are not essential and thus, the POS peripherals controlling device 100 having more or less components may be implemented.

Hereinafter, the components are described one by one.

The communication unit 110 may include at least one module for allowing communication between the POS peripherals controlling device 100 and a wireless communication system or between the POS peripherals controlling device 100 and a network where the host device 200 is located. For example, through the communication unit 110, the POS peripherals controlling device 100 may communicate data with the outside by using at least one of WiFi, Bluetooth, ZigBee, WiGig, Radio Frequency Identification (RFID), infrared Data Association (IrDA), Ultra Wideband (UWB), and WiHD.

Of course, the communication unit 110 may include a wired communication module in addition to a wireless communication module. For example, through the communication unit 110, the POS peripherals controlling device 100 may communicate data with the outside by using at least one communication method of a USB method, a serial method, and a parallel method.

Through the communication unit 110, the POS peripherals controlling device 100 may receive various data from the host device 100 and transmit necessary data to the host device 100.

The at least one peripheral controlling module 120 may perform a function for communicating data properly in correspondence to a type of at least one POS peripheral 300 connected to the POS peripherals controlling device 100 through the interface part 130 described below.

For example, a first peripheral controlling module 1201 may include a function for communicating with a printer among various POS peripherals and a second peripheral controlling module 1202 may include a function for communicating with a cash drawer among various POS peripherals.

For another example, the first peripheral controlling module 1201 may include a function for communicating with a printer manufactured by A company among various printers and the second peripheral controlling module 1202 may include a function for communicating with a printer manufactured by B company among various printers.

Through the at least one peripheral controlling module 120, the POS peripherals controlling device 100 may communicate with various POS peripherals 300 by using a proper method.

The interface part 130 may provide a function for allowing at least one POS peripheral 300 to be connected to the POS peripherals controlling device 100.

For example, through the interface part 130, the POS peripherals controlling device 100 may communicate data with at least one POS peripheral 300 by using at least one of WiFi, Bluetooth, ZigBee, WiGig, RFID, IrDA, UWB, and WiHD.

Of course, the interface part 130 may include a wired communication module in addition to a wireless communication module. For example, through the interface part 130, the POS peripherals controlling device 100 may communicate data with POS peripherals by using at least one communication method of a USB method, a serial method, and a parallel method.

Through the interface part 130, the POS peripherals controlling device 100 may transmit various data, received from the host device 100, to at least one POS peripheral 300 again and receive necessary data from the at least one POS peripheral 300.

The interface part 130 may include a plurality of interface units 1301, 1302, . . . , 130p. At this point, all of the p interface units 1301, 1302, . . . , 130p may be units for communication through an A method (for example, a USB method). Furthermore, a of the p interface units 1301, 1302, . . . , 130p may be units for communication through an A method (for example, a USB method) and (p-a) of the p interface units 1301, 1302, . . . , 130p may be units for communication through a B method (for example, a serial method).

The memory 140 may store various data necessary for an operation of the POS peripherals controlling device 100.

For example, the memory 140 may store a program for an operation of the controller 150 and/or at least one peripheral controlling module 120 and may various data (for example, data received from a host device, data received from POS peripherals, data to be transmitted to a host device, and data to be transmitted to POS peripherals).

Moreover, the memory 140 may match identification information of the POS peripherals 300 and information on an interface unit connected to the POS peripherals 300 and store it.

The memory unit 140 may include at least one type of storage medium among flash memory type, hard disk type, multimedia card micro type, card type memory (for example, SD or XD memory), random access memory (RAM), static random access memory (SRAM), read-only memory (ROM), electrically erasable programmable read-only memory (EEPROM), programmable read-only memory (PROM), magnetic memory, magnetic disk, and optical disk.

The controller 150 may control overall operations of the POS peripherals controlling device 100.

Various embodiments described herein may be implemented in recording media that can be readable by computers or devices similar thereto through software, hardware, or a combination thereof.

Through hardware implementations, embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing functions. In some cases, such embodiments may be implemented by the controller 150.

Through software implementations, embodiments relating to procedures or functions may be implemented together with an additional software module for performing at least one function or operation. Software code may be implemented by a software application written in an appropriate program language. Additionally, software code may be stored in the memory 140 and executed by the controller 150 and/or at least one peripheral controlling module 120.

Figure 3:
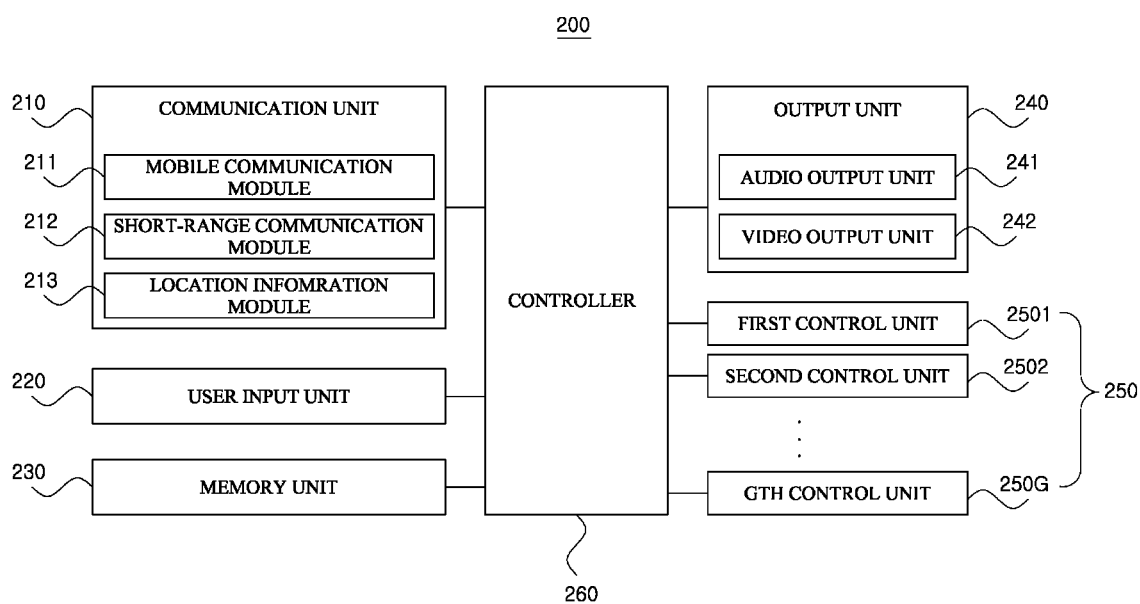
FIG. 3 is a block diagram of a host device connected to a POS peripherals controlling device according to an embodiment of the present invention.

FIG. 3 is a block diagram of a host device connected to a POS peripherals controlling device according to an embodiment of the present invention.

The host device 200 may include a communication unit 210, a user input unit 220, a memory unit 230, an output unit 240, at least one control unit 250, and a controller 260. Components shown in FIG. 3 are not necessary, so that a host device having less or more components may be implemented.

Hereinafter, the components are described one by one.

The communication unit 210 may include at least one module for allowing wireless communication between the host device 200 and a wireless communication system or between the host device 200 and a network where the POS peripherals controlling device 100 is located.

For example, the communication unit 210 may include a mobile communication module 211, a short-range communication module 212, and a location information module 213.

The mobile communication module 211 transmits/receives wireless signals to/from at least one of a base station, an external terminal, and a server on a mobile communication network. The wireless signal may include various types of data according to a voice call signal, a video call signal, or text/multimedia message transmission.

The short-range communication module 212 refers to a module for short-range communication. As short-range communication technology, provided are WiFi, Bluetooth, ZigBee, WiGig, RFID, IrDA, UWB, and WiHD.

The location information module 213 is a module for checking or obtaining the location of the host device 200. A representative example of the location information module includes a Global Positioning System (GPS) module. Moreover, in order to check the position of the host device 200 in the room, WiFi technique and/or RFID technique are applied recently.

The host device 200 may communicate with the POS peripherals controlling device 100 through the communication unit 210.

The user input 220 may perform a function for receiving necessary data and/or commands from a user. Based on necessary data and/or commands received from a user, the user input 220 may generate input data for controlling an operation of the host device 200 and a user may generate input data for controlling an operation of the POS peripherals 300.

The user input unit 130 may include a keyboard, a mouse, a keypad, a dome switch, a touch pad (for example, static pressure/electrostatic), a jog wheel, and a jog switch.

The POS peripherals controlling device 100 is not limited thereto and based on input data generated through the user input unit 220, may select some requiring an operation control among at least one POS peripheral 300 and additionally generate a control command to be transmitted to the selected some. Of course, the generation of the control command is not necessary accomplished when data and/or commands are inputted from a user through the user input unit 220.

The memory unit 230 may store various data necessary for an operation of the host device 200.

For example, the memory unit 230 may store a program for an operation of the controller 260 and/or at least one control unit 250 described below and also may store various data (for example, data received from POS peripherals, data to be transmitted to POS peripherals, and data received from a user through the user input unit 220).

furthermore, the memory unit 240 may store identification information of the POS peripherals 300.

The memory unit 230 may include at least one type of storage medium among flash memory type, hard disk type, multimedia card micro type, card type memory (for example, SD or XD memory), random access memory (RAM), static random access memory (SRAM), read-only memory (ROM), electrically erasable programmable read-only memory (EEPROM), programmable read-only memory (PROM), magnetic memory, magnetic disk, and optical disk. Additionally, the memory unit 230 may be implemented in a web storage form.

The output unit 240 used for generating a visual or auditory output may include an audio output unit 241 and a video output unit 242.

The audio output unit 241 may output information relating to a function performed by the host device 200 acoustically. The audio output unit 241 may include a receiver, a speaker, and a buzzer.

The video output unit 242 visually outputs information processed in the electronic device 200. For example, the host device 200 may display a Graphic User Interface (GUI) for a user through the video output unit 242.

The video output unit 242 may include at least one of a liquid crystal display, a thin film transistor-liquid crystal display, an organic light-emitting diode, a flexible display, and a 3D display.

When the video output unit 242 and a sensor (hereinafter referred to as a touch sensor) for detecting a touch operation form a mutual layer structure (hereinafter referred to as a touch screen), the video output unit 242 may be used as an input device in addition to an output device. The touch sensor, for example, may have a form of a touch film, a touch sheet, and a touch pad.

At least one control unit 250 may perform a function for generating a control command to properly control the POS peripherals 300 in correspondence to each of at least one POS peripheral 300.

For example, a first control unit 2501 may include a function for properly generating a control command to be transmitted to a printer among various POS peripherals and a second control unit 2502 may include a function for properly generating a control command to be transmitted to a cash drawer among various POS peripherals.

For example, the first control unit 2501 may include a function for properly generating a control command to be transmitted to a printer manufactured by A company among various printers and the second control unit 2502 may include a function for properly generating a control command to be transmitted to a printer manufactured by B company among various printers.

When a POS peripheral is selected for operation control, the host device 200 may call a control unit corresponding to the determined POS peripheral and generate a control command in a format that the determined POS peripheral processes properly, through the called control unit.

The controller 260 controls overall operations of the host device 200.

Various embodiments described herein may be implemented in recording media that can be readable by computers or devices similar thereto through software, hardware, or a combination thereof.

Through hardware implementations, embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing functions. In some cases, such embodiments may be implemented by the controller 260.

Through software implementations, embodiments relating to procedures or functions may be implemented together with an additional software module for performing at least one function or operation. Software code may be implemented by a software application written in an appropriate program language. Additionally, the software code may be stored in the memory unit 260 and executed by the controller 260 and/or the control units 250.

Hereinafter, a control method of a POS peripherals controlling device according to an embodiment of the present invention is described.

Hereinafter, by using the host device 200 and the POS peripherals controlling device 100 described with reference to FIGS. 1 to 3, a control method of a POS peripherals controlling device according to an embodiment of the present invention is described. However, it should be clear that a control method of a POS peripherals controlling device according to an embodiment of the present invention is not necessarily implemented by the host device 200 and the POS peripherals controlling device 100 described with reference to FIGS. 1 to 3.

Additionally, hereinafter, for convenience of description, it is described exemplarily that the host device 200 is an electronic device having excellent mobility and portability such as a tablet PC or a smartphone, and also it is described exemplarily that the host device 200 and the POS peripherals controlling device 100 communicate with each other through a wireless communication method. Furthermore, it is described exemplarily that the POS peripherals controlling device 100 and at least one POS peripheral 300 communicate with each other through a wired communication method. However, this is merely for convenience of description and it is not excluded from the scope of the present invention that the host device 200 and the POS peripherals controlling device 100 communicate with each other by using a wired communication method and additionally, it is not excluded from the scope of the present invention that the POS peripherals controlling device 100 and at least one POS peripheral 300 communicate with each other by using a wireless communication method.

1. Host Device—Connection of POS Peripherals Controlling Device

The POS peripherals controlling device 100 may be connected to the host device 200. That is, the POS peripherals controlling device 100 may communicate various data with the host device 200.

The POS peripherals controlling device 100 may communicate with the host device 200 through the communication unit 110. As mentioned above, the POS peripherals controlling device 100 and the host device 200 may communicate with each other through a wired communication method and a wireless communication method.

When the POS peripherals controlling device 100 and the host device 200 communicate with each other through a wireless communication method, a connection procedure necessary for a corresponding communication method may be performed. For example, when the POS peripherals controlling device 100 and the host device 200 attempt to communicate with each other through a Bluetooth method, a pairing procedure necessary for a Bluetooth communication method may be performed.

If the POS peripherals controlling device 100 has identification information on at least one POS peripheral 300 connected to the POS peripherals controlling device 100, when being connected to the host device 200, the POS peripherals controlling device 100 may transmit the information on at least one POS peripheral 300 to the host device 200.

Of course, if the POS peripherals controlling device 100 does not contain identification information on POS peripherals 300, a procedure for transmitting the identification information on POS peripherals 300 may be omitted. However, in such a case, as described later, after the POS peripherals controlling device 100 obtains identification information on POS peripherals 300, the identification information may be transmitted to the host device 200.

After the POS peripherals controlling device 100 is connected to the host device 200, it may receive various commands and/or data from the host device 200 and perform proper operations according to the received command and/or data. Additionally, the POS peripherals controlling device 100 may transmit necessary data to the host device 200.

2. POS Peripherals Controlling Device—Connection of POS Peripherals

The POS peripherals controlling device 100 may be connected to at least one POS peripheral 300. That is, the POS peripherals controlling device 100 may communicate various data with the POS peripherals 300.

The POS peripherals controlling device 100 may communicate with at least one POS peripheral 300 through the interface part 130. As mentioned above, the POS peripherals controlling device 100 and the POS peripherals 300 may communicate with each other through a wired communication method and a wireless communication method.

When the POS peripherals controlling device 100 and at least one POS peripheral 300 communicate with each other through a wireless communication method, a connection procedure necessary for a corresponding communication method may be performed. For example, when the POS peripherals controlling device 100 and at least one POS peripheral 300 attempt to communicate with each other through a Bluetooth method, a pairing procedure necessary for a Bluetooth communication method may be performed.

After the POS peripherals controlling device 100 is connected to the at least one POS peripheral 300, the POS peripherals controlling device 100 may transmit various commands and/or data to the at least one POS peripheral 300 and also may receive necessary data from the at least one POS peripheral 300.

When being connected to POS peripherals 300, the POS peripherals controlling device 100 may perform a procedure for obtaining identification information of each of the POS peripherals 300.

The identification information may be device unique information allocated to each of the POS peripherals 300. For example, when a first POS peripheral has a unique device number, the unique device number of the first POS peripheral may be the identification information.

Additionally, the identification information may be allocation information that the POS peripherals controlling device 100 allocates to each of the POS peripherals 300. For example, the POS peripherals controlling device 100 may arbitrarily allocate the identification information 'XXX' to the first POS peripheral and the identification information 'YYY' to the second POS peripheral.

At this point, the POS peripherals controlling device 100 may check a device type of a connected POS peripheral and allocate the identification information in consideration of the device type. A method of the POS peripherals controlling device 100 to check a device type of a POS peripheral may vary.

For example, when the POS peripherals controlling device 100 and POS peripherals 300 are connected to each other, the POS peripherals controlling device 100 may identify a device type by checking PnP information.

For another example, by transmitting a device-dependent command to the POS peripherals 300 and checking a response to a corresponding command, a device type may be denitrified. That is, when a command that a corresponding POS peripheral recognizes and responds to is transmitted to one POS peripheral (for example, a printer), a response thereto is received, but when a command that a printer recognizes and responds to is transmitted to another POS peripheral (for example, a cash drawer), a response thereto is not received. By using this method, types of the POS peripherals 300 may be checked.

Moreover, a method of the POS peripherals controlling device 100 to allocate the identification information in consideration of a device type of a POS peripheral may vary.

First, the POS peripherals controlling device 100 may allocate a predetermined identification information range in advance with respect to each of types of various POS peripherals and after checking a type of a connected POS peripheral, may allocate an arbitrary value in an identification information range corresponding to the checked type to the connected POS peripheral. For example, the POS peripherals controlling device 100 allocates an A-B range in advance with respect to a first type POS peripheral (for example, a POS printer) and allocates a C-D range in advance with respect to a second type POS peripheral (for example, a cash drawer). At this point, when it is determined that a connected POS peripheral is a first type, an arbitrary value in the A-B range may be allocated to the connected POS peripheral, and when it is determined that a connected POS peripheral is a second type, an arbitrary value in the C-D range may be allocated to the connected POS peripheral, However, when identification information is allocated through such a method, the POS peripherals controlling device 100 may allocate a value not allocated to another POS peripheral among values in a range corresponding to each type may be allocated to the connected POS peripheral.

For example, two or more POS peripherals having the same type may be connected to the POS peripherals controlling device 100 (that is, two or more POS printers may be connected). At this point, if one among values in the A-B range is allocated to one POS peripheral connected first, one of the remaining values except for the already-allocated value may be selected from the A-B range and allocated to the same type of a POS peripheral connected later.

Second, the POS peripherals controlling device 100 may allocate different identifiers in advance with respect to each of types of various POS peripherals and after checking a type of a connected POS peripheral, may allocate an arbitrary value including an identifier corresponding to the checked type to a connected POS peripheral. For example, the POS peripherals controlling device 100 allocates the identifier 'P' in advance with respect to a first type POS peripheral (for example, a POS printer) and allocates the identifier 'C' in advance with respect to a second type POS peripheral (for example, a cash drawer). At this point, when it is determined that a connected POS peripheral is a first type, 'PXXX' (at this point, XXX are arbitrarily selected values) may be allocated to the connected POS peripheral, and when it is determined that a connected POS peripheral is a second type, 'CYYY' (at this point, YYY are arbitrarily selected values) may be allocated to the connected POS peripheral, However, when identification information is allocated by such a method, the POS peripherals controlling device 100 may allow different identification information to be allocated to different POS peripherals.

Besides, the POS peripherals controlling device 100 may allocate identification information to POS peripherals by using various methods.

After obtaining identification information according to a connection of the POS peripherals 300, the POS peripherals controlling device 100, as mentioned above, may store the obtained identification information in the memory 140.

Moreover, after obtaining identification information according to a connection of the POS peripherals 300, the POS peripherals controlling device 100, as mentioned above, may transmit the obtained identification information to the host device 200. However, if the POS peripherals controlling device 100 is not connected to the host device 200, it may store obtained identification information in the memory 140 and after being connected to the host device 200, transmit the obtained identification information.

Moreover, when being connected to POS peripherals 300, the POS peripherals controlling device 100 may perform a procedure for obtaining information on an interface unit connected to each of the POS peripherals 300. That is, when being connected to a POS peripheral, the POS peripherals controlling device 100 may check through which interface unit among at least one of the interface units 1301, 1302, . . . , 130*p* the connected POS peripheral is connected and may obtain information on the obtained interface unit (for example, types of ports, the number of ports, and so on).

After obtaining information on the interface units 1301, 1302, . . . , 130*p* connected to each of the POS peripherals 300, the POS peripherals controlling device 100 may store the obtained information in the memory 140. The obtained information may be matched to each of the POS peripherals 300 and stored.

If changes occurs in identification information on the POS peripherals 300 and/or information on the interface units 1301, 1302, . . . , 130*p*, which is matched to the POS peripheral 300 and stored, the POS peripherals controlling device 100 may update it with a changed value and store the updated information.

For example, when the same POS peripheral is connected to the POS peripherals controlling device 100 and its connection is released and then is connected to the POS peripherals controlling device 100 again, identification information that the POS peripheral is assigned by the POS peripherals controlling device 100 is different from identification information assigned during first connection, in such a case, the POS peripherals controlling device 100 may perform update with respect to such changed information. However, when connection and connection release occurs repeatedly between the same POS peripheral and the POS peripherals controlling device 100, since it is inefficient to perform an assignment procedure of identification information during each connection, the POS peripherals controlling device 100 may maintain previously assigned identification information without deleting it when a POS peripheral is disconnected and in such a case, when the same POS peripheral is connected, may use previously assigned identification information as it is. In order for such an operation, the POS peripherals controlling device 100 may match device unique information of a POS peripheral and the assigned identification information and store it.

For another example, when the same POS peripheral is first connected to the POS peripherals controlling device 100 by using the first interface unit 1301 and after the connection released, is again connected to the POS peripherals controlling device 100 by using the second interface unit 1302, the POS peripherals controlling device 100 may update such changed information.

3. Command Transmission from Host Device to POS Peripheral

Hereinafter, the host device 200 controls the POS peripherals 300 and a series of procedures for a control through the POS peripherals controlling device 100 will be described in more detail. For convenience of description, hereinafter, it is assumed and described that the host device 200, the POS peripherals controlling device 100, and at least one POS peripheral 300 are connected to each other through a wired/wireless method, and also it is assumed and described that acquisition and sharing on identification information of the POS peripherals 300 (that is, sharing on identification information between the POS peripherals controlling device 100 and the host device 200) and acquisition of information on an interface unit connected to the POS peripherals 300 are completed.

Figure 4:
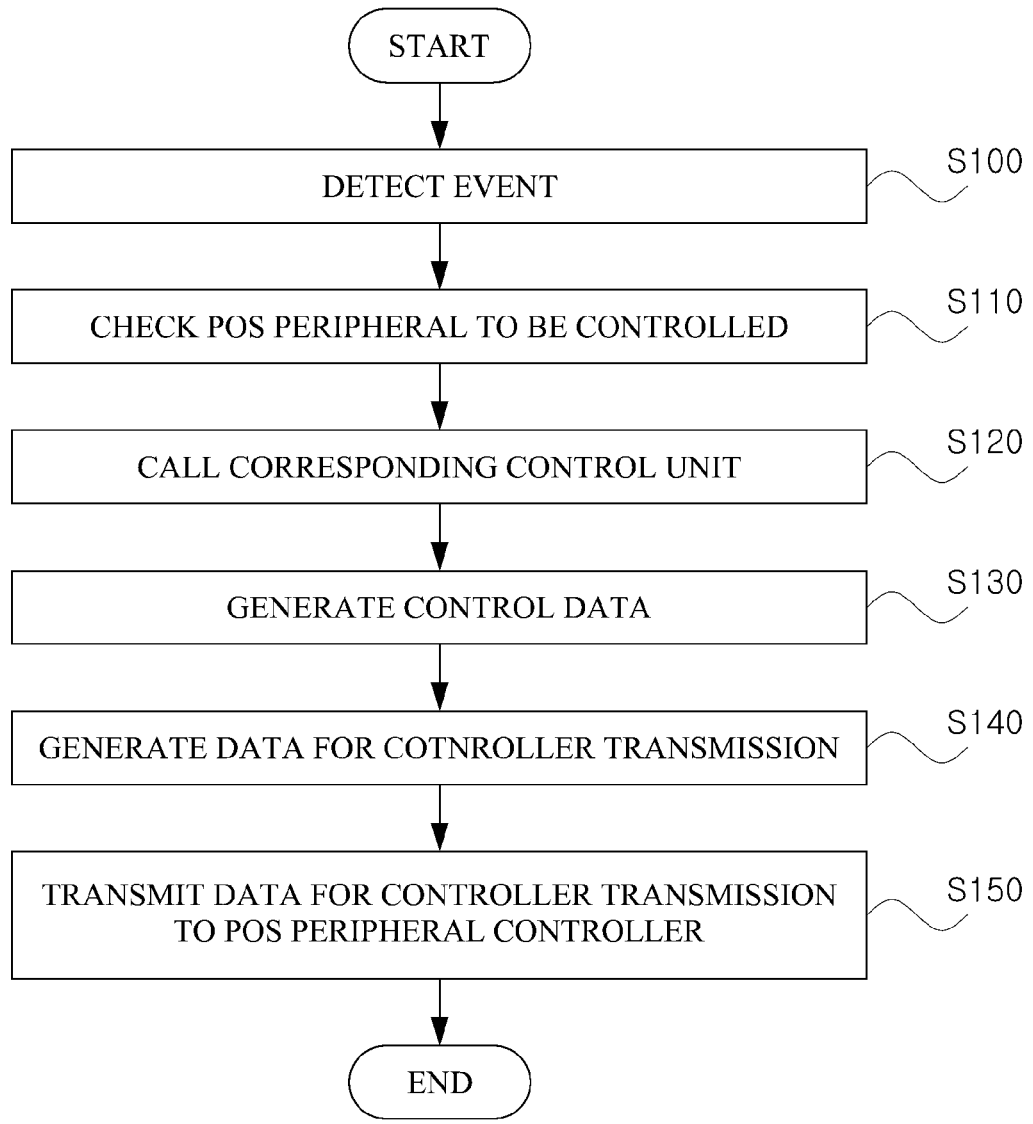
FIGS. 4 to 6 are views illustrating a series of procedures from transmitting a command from a host device to a POS peripheral according to an embodiment of the present invention.
Figure 5:
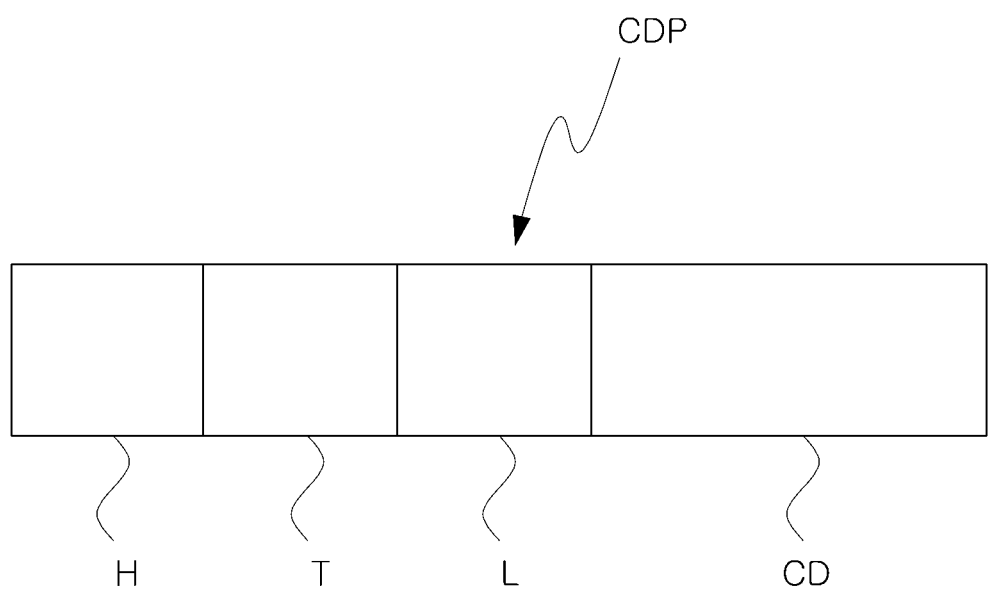
Figure 6:
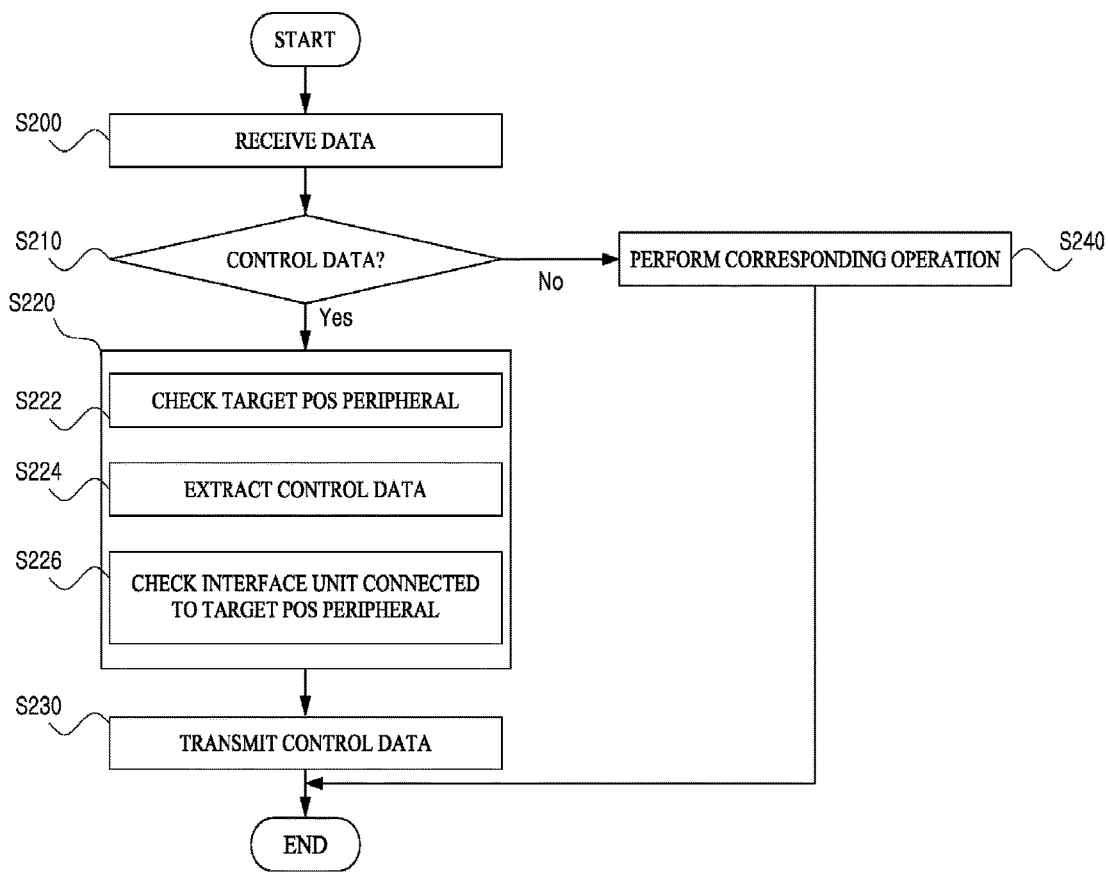

FIGS. 4 to 6 are views illustrating a series of procedures for transmitting a command from a host device to a POS peripheral according to an embodiment of the present invention.

(1) Command Generation of Host Device

FIG. 4 is a flowchart illustrating operations for generating a command by the host device 200 and transmitting the generated command to the POS peripherals controlling device 100 during a series of procedures for transmitting a command from a host device to a POS peripheral according to an embodiment of the present invention.

Referring to FIG. 4, the host device 200 may perform detecting an event in operation S100, checking a POS peripheral to be controlled based on the event in operation S110, calling a control unit corresponding to the checked POS peripheral in operation S120, generating control data through a called control unit in operation S130, generating data for controller transmission including the generated control data in operation S140, and transmitting the generated data for controller transmission to a POS peripherals controlling device in operation S150.

The operations may be controlled by the controller 260 of the host device 200. Hereinafter, each operation will be described in detail.

The host device 200 may detect an event in operation S100.

The event is to control at least one of at least one POS peripheral 300 connected to the POS peripherals controlling device 100.

The event, for example, may be a user input for controlling at least one of at least one POS peripheral 300. At this point, the user input may be accomplished through the user input unit 220.

The event, for another example, may be the reception of a request signal for controlling at least one of at last one POS peripheral 300, which is generated by an application program running on the host device 200. The application program may generate/transmit the request signal according to a user's request and may generate/transmit the request signal regardless of a user's request.

The event, for another example, may be the reception of a request signal for controlling at least one of at least one POS peripheral 300, which is generated by Operating System (OS) that controls overall operations of the host device 200.

A target POS peripheral to be controlled may be specified by the event.

For example, the target POS peripheral may be specified by the user input. For another example, the target POS peripheral may be specified by a request signal generated/transmitted by the application program. For another example, the target POS peripheral may be specified by a request signal generated/transmitted by the OS.

An operation that the target POS peripheral is required to perform may be specified by the event.

For example, an operation for controlling the target POS peripheral may be specified by the user input. For another example, information on an operation for controlling the target POS peripheral may be contained in a request signal generated/transmitted by the application program. For another example, information on an operation for controlling the target POS peripheral may be contained in a request signal generated/transmitted by the OS.

When an event occurrence is detected, the host device 200 may check a POS peripheral to be controlled (for example, a target POS peripheral) on the basis of the detected event in operation S110.

As mentioned above, a target POS peripheral may be specified by an event and the host device 200 may check the target POS peripheral by analyzing the content of the detected event.

When a target POS peripheral is checked, the host device 200 may call a control unit corresponding to the checked POS peripheral in operation S120.

For example, when the checked target POS peripheral is a first POS peripheral (for example, a POS printer), a first control unit 2501 corresponding to the first POS peripheral may be called and when the checked target POS peripheral is a second POS peripheral (for example, a cash drawer), a second control unit 2502 corresponding to the second POS peripheral may be called.

As mentioned above, the called control unit is provided with a function for generating a control command for properly controlling the checked target POS peripheral.

Then, the host device 200 may generate control data CD for controlling an operation of the target POS peripheral through a called control unit in operation S130. In this specification, the control data may be called a control command or a command.

The control data, as mentioned above, may be generated based on an operation for controlling a target POS peripheral, which is specified by the event. That is, first control data for a first operation may be different from second control data for a second operation.

The control data has a format that is processed by the specified POS peripheral. That is, the control data has a format dependent on the type of the specified POS peripheral, and control data having a format for controlling a first POS peripheral may be processed by a first POS peripheral but may not be processed by a second POS peripheral.

The host device 200 may generate data for controller transmission including the generated control data in operation S140.

In this specification, the data for controller transmission may be called a data packet for controller transmission or a control packet.

The data for controller transmission is generated for more accurately and efficiently controlling at least one POS peripheral 300 through a POS peripherals controlling device according to an embodiment of the present invention. Data for controller transmission will be described in more detail.

FIG. 5 is a view illustrating a data structure of data for controller transmission according to an embodiment of the present invention.

Referring to FIG. 5, data for controller transmission CDP may include a header part H including information representing the data for controller transmission, an identification information part T including identification information of a target POS peripheral that is to receive control data CD included in the data for controller transmission CDP, a length part L including information representing the length of control data included in the data for controller transmission CDP, and a control data part CD including the generated control data.

A function of the header part H will be described.

In general, the POS peripherals controlling device 100 may receive various data from the host device 200. For example, the POS peripherals controlling device 100 and the host device 200 may communicate necessary data according to a defined communication method through which they are connected to each other for communication, and for another example, the host device 200 may transmit data for controlling an operation of the POS peripherals controlling device 100. That is, only some of data that the POS peripherals controlling device 100 receives from the host device 200 may be control data for controller transmission CDP including control data CD for controlling a POS peripheral.

The header part H has a function for allowing the POS peripherals controlling device 100 to recognize that currently transmitted data is control data for controller transmission CDP including control data CD for controlling a POS peripheral.

A value included in the header part H of the data for controller transmission may be a fixed value defined by a protocol between the POS peripherals controlling device 100 and the host device 200. For example, the present invention is not limited thereto but in order to represent data for controller transmission, a value used in the header part H may be fixed to 'HD'.

In order for a more efficient function of the header part H, the header part H may be located in the most front part of the data for controller transmission CDP.

The identification information part T may include identification information of the target POS peripheral that is required to receive the control data CD included in data for controller transmission CDP.

The host device 200 may obtain identification information of the target POS peripheral on the basis of the target POS peripheral checked in operation S110 and, as mentioned above, identification information on at last one POS peripheral 300 received from the POS peripherals controlling device 100.

By the identification part T, the POS peripherals controlling device 100 that receives data for controller transmission CDP may identify which one is the target POS peripheral among at least one POS peripheral 300 (that is, which one is a target POS peripheral to which control data CD is to be transmitted).

The length part L may include information on the length (that is, the size of control data CD) of control data CD following the length part L. By the length part L, the POS peripherals controlling device 100 more accurately recognize control data CD included in the data for controller transmission CDP.

The length part L, for example, may represent bytes of the control data CD. That is, when data included in the length part L is '2', the size of the control data is two bytes.

In order for a more efficient function of the length part L, the length part L may be located directly in front of the control data CD.

The control data CD is generated in operation S130.

The sizes of the header part H, the identification information part T, and the length part L may be two bytes, one byte, and one byte, respectively. The size of the control data CD may be variable.

As mentioned above, as the host device 200 generates data for controller transmission CDP including various other information with control data CD and transmits it to the POS peripherals controlling device 100, instead of simply generating only control data CD and transmitting it to the POS peripherals controlling device 100, it is possible to allow the POS peripherals controlling device 100 to be more accurately and organically linked with a target POS peripheral and be able to operate.

Moreover, data for controller transmission CDP is not necessarily implemented with the data structure described with reference to FIG. 5. For example, control data CD included in the data for controller transmission CDP may be implemented with a fixed length instead of a variable length and in such a case, the length part L may be omitted. For example, the position of each part of the data for controller transmission CDP is not necessarily disposed according to the order shown in FIG. 5. That is, data for controller transmission CDP may be configured in the order of header part H—length part L—control data CD—identification information part T.

Then, the host device 200 may transmit the generated data for controller transmission CDP to the POS peripherals controlling device 100.

At this point, the host device 200 may transmit the generated data for controller transmission CDP as it is to the POS peripherals controlling device 100 but the data for controller transmission CDP may be processed additionally according to a defined communication method for connecting the host device 200 and the POS peripherals controlling device 100 and transmitted to the POS peripherals controlling device 100. For example, when the host device 200 and the POS peripherals controlling device 100 are connected by a Bluetooth method, various data according to a defined Bluetooth protocol may be attached to the data for controller transmission and such added processed data may be transmitted to the POS peripherals controlling device 100.

(2) Command Reception and Delivery of POS Peripheral

As described with reference to FIGS. 4 and 5, when the host device 200 transmits data for controller transmission CDP to the POS peripherals controlling device 100, as the POS peripherals controlling device 100 transmits control data CD included in data for controller transmission CDP to a target POS peripheral properly by performing a necessary predetermined operation. Hereinafter, an operation of the POS peripherals controlling device 100 is described in more detail.

FIG. 6 is a flowchart illustrating operations of the POS peripherals controlling device 100 during a series of procedures for transmitting a command from a host device to a POS peripheral according to an embodiment of the present invention.

Referring to FIG. 6, the POS peripherals controlling device 100 may perform receiving data from the host device 200 in operation S200, checking whether the received data includes control data CD in operation S210, preparing the transmission of the control data when the control data is included in operation S220, and transmitting prepared control data to a target POS peripheral in operation S230. Moreover, when the received data does not include the control data CD, the POS peripherals controlling device 100 may perform an operation corresponding to the received data in operation S240.

Each operation may be controlled by the controller 150 of the POS peripherals controlling device 100. Hereinafter, each operation will be described in detail.

The POS peripherals controlling device 100 may receive data from the host device 200 in operation S200.

When receiving data from the host device 200, the POS peripherals controlling device 100 may check whether the received data includes control data CD in operation S210.

The POS peripherals controlling device 100 may perform operation S210 by checking the header part H of the received data. That is, as mentioned above, it is checked whether control data CD is included in data for controller transmission CDP and whether a value representing data for controller transmission CDP is included in the header part H. For example, the present invention is not limited thereto but the POS peripherals controlling device 100 may check whether a value of the header part H is 'HD'.

If the received data is data for controller transmission (that is, control data is included in the received data), the POS peripherals controlling device 100 may provide a preparation for transmitting control data to a target POS peripheral in operation S220. In operation S220, the POS peripherals controlling device 100 may perform checking a target POS peripheral in operation S222, extracting control data in operation S224, and checking an interface unit connected to the target POS peripheral among at last one interface part 130 in operation S226.

Operation S220 may be performed based on a result obtained by analyzing the received data for controller transmission.

For example, in order for operation S222, the POS peripherals controlling device 100 may check the identification information part T included in the data for controller transmission CDP.

Additionally, in order for operation S224, the POS peripherals controlling device 100 may obtain control data CD included in the data for controller transmission CDP by checking the length part L included in the data for controller transmission CDP.

As the POS peripherals 300 are connected to the POS peripherals controlling device 100 on the basis of identification information obtained through operation S222, as mentioned above, the POS peripherals controlling device 100 may check an interface unit connected to the checked target POS peripheral by referring to a 'POS peripheral identification information—information of corresponding interface unit' matching table.

The POS peripherals controlling device 100 may transmit control data prepared through operation S220 to a target POS peripheral in operation S230.

The POS peripherals controlling device 100 may transmit only control data CD included in the data for controller transmission CDP to a target POS peripheral instead of transmitting data for controller transmission CDP received from the host device 200 as it is to a target POS peripheral.

In order to perform operation S230, the POS peripherals controlling device 100 may activate a peripheral control module corresponding to the checked target POS peripheral among at least one peripheral controlling module 120. By the activated peripheral control module, the POS peripherals controlling device 100 and a target POS peripheral may perform communication on the basis of a proper method.

4. Data Transmission from POS Peripheral to Host Device

Hereinafter, in order to transmit necessary data from the POS peripherals 300 to the host device 200, a series of procedures for controlling the POS peripherals controlling device 100 and the host device 200 according to an embodiment of the present invention will be described in more detail.

Figure 7:
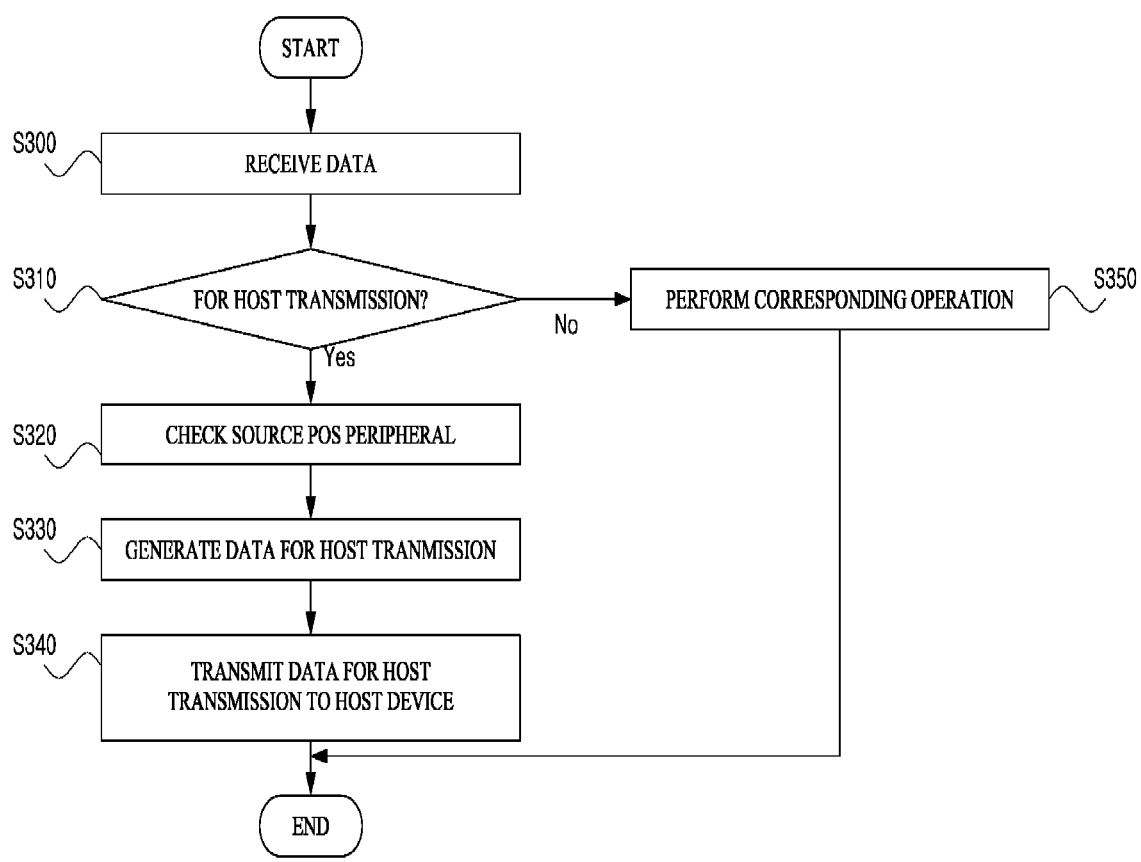
FIGS. 7 to 9 are views illustrating a series of procedures for transmitting data from POS peripherals to a host device according to an embodiment of the present invention.
Figure 8:
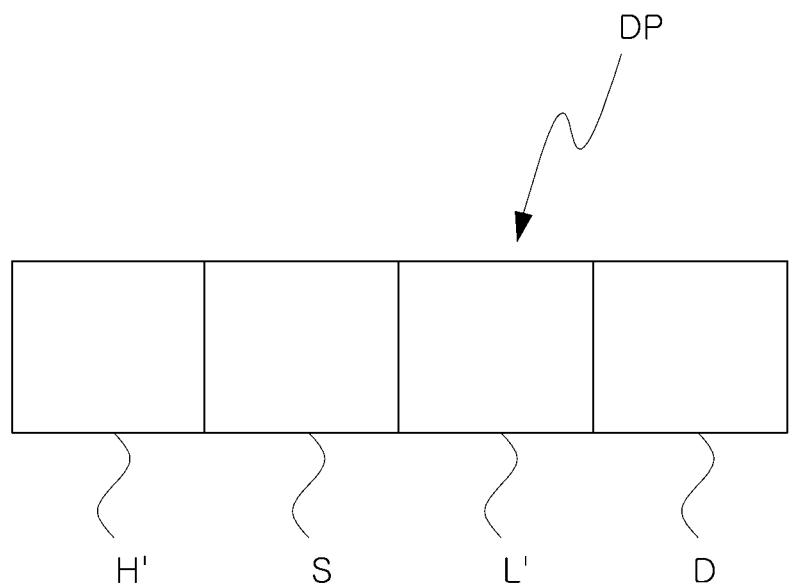
Figure 9:
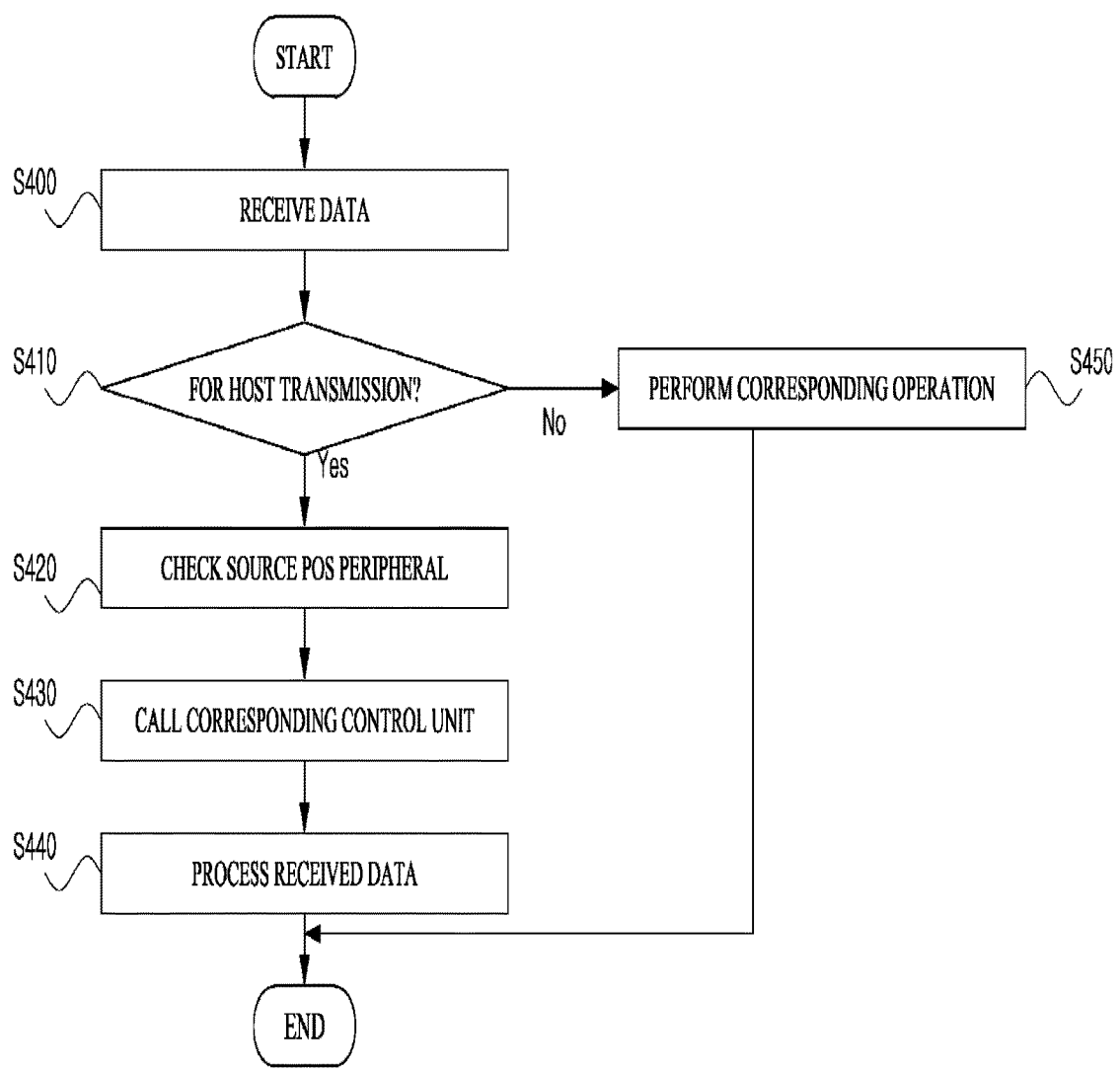

FIGS. 7 to 9 are views illustrating a series of procedures for transmitting data from POS peripherals to a host device according to an embodiment of the present invention.

(1) Data Reception and Delivery of POS Peripherals Controlling Device

FIG. 7 is a flowchart illustrating operations for receiving data from the POS peripheral 300 by the POS peripherals controlling device 100 and transmitting the received data to the host device 200 during a series of procedures for transmitting a command from a POS peripheral to a host device according to an embodiment of the present invention.

Referring to FIG. 7, the POS peripherals controlling device 100 may perform receiving data from at least one POS peripheral 300 in operation S300, checking whether the received data includes data to be transmitted to the host device 200 in operation S310, checking a source POS peripheral in operation S320 when the received data includes data to be transmitted to the host device 200, generating data for host transmission including the received data in operation S330, and transmitting the generated data for host transmission to the host device 200 in operation S340. Moreover, when data received from the POS peripherals 300 does not include data to be transmitted to the host device 200, the POS peripherals controlling device 100 may perform an operation corresponding thereto in operation S350.

Each operation may be controlled by the controller 150 of the POS peripherals controlling device 100. Hereinafter, each operation will be described in detail.

The POS peripherals controlling device 100 may receive data from the host device 200 in operation S200.

Then, the POS peripherals controlling device 100 may check whether the received data includes data to be transmitted to the host device 200 in operation S310. For example, the POS peripherals controlling device 100 and the POS peripherals 300 may communicate necessary data according to a defined communication method through which they are connected to each other for communication, and the POS peripherals controlling device 100 may check whether the received data includes data to be transmitted to the host device 200.

If the received data includes data to be transmitted to the host device 200, the POS peripherals controlling device 100 may check a source POS peripheral in operation S320.

When receiving data from the POS peripherals 300, the POS peripherals controlling device 100 may check through which interface unit among the at least one interface unit (the interface part 130) data is received and as mentioned above, may check the source POS peripheral on the basis of information that is stored in the memory 140 by matching each of the POS peripherals 300 and interface units 130 connected to each of the POS peripherals 300.

For example, when it is checked that 'first POS peripheral—second interface unit' and 'second POS peripheral—first interface unit' are matched in a match table stored in the memory 140 and the data is received through the first interface unit, the POS peripherals controlling device 100 may determine that the second POS peripheral is a source peripheral.

Then, the POS peripherals controlling device 100 may generate data for host transmission including the received data in operation S330.

The data for host transmission may be called a data packet for host transmission or a data packet.

The data for host transmission is generated for more accurately and efficiently controlling an operation for transmission from at least one POS peripheral 300 to the host device 200 through a POS peripherals controlling device according to an embodiment of the present invention. Data for host transmission will be described in more detail.

FIG. 8 is a view illustrating a data structure of data for host transmission according to an embodiment of the present invention.

Referring to FIG. 8, data for host transmission DP may include a header part H' including information representing the data for host transmission DP, an identification information part S including identification information of a source POS peripheral for transmitting data D to be transmitted to the host device 200, a length part L' including information representing the length of data included in the data for host transmission DP, and a data part D including the received data.

A function of the header part H' will be described.

The function of the header part H' is very similar to the function of the header part included in the above-mentioned data for controller transmission CDP and the header unit H' has a function for allowing the host device 200 to recognize that currently transmitted data is data for host transmission DP including data D transmitted from the POS peripherals 300.

A value included in the header part H' of the data for host transmission may be a fixed value defined by a protocol between the POS peripherals controlling device 100 and the host device 200. In order for a more efficient function of the header part H', the header part H' may be located in the most front part of the data for host transmission DP.

The identification information part S may include identification information of the source POS peripheral that transmits the data D included in the data for host transmission DP.

The POS peripherals controlling device 100, as described in operation S320, may obtain identification information of a source POS peripheral.

By the identification part S, the host device 200 that receives data for host transmission DP may identify which one is the source POS peripheral among at least one POS peripheral 300 (that is, which one is a source POS peripheral that transmits data D).

The length part L' may include information on the length (that is, the size of data D) of data D following the length part L'. By the length part L', the host device 100 may more accurately recognize data D included in the data for host transmission DP.

The length part L', for example, may represent bytes of the data D. That is, when data included in the length part L' is '2', it represents that the size of the data is two bytes and in order for a more efficient function of the length part L', the length part L' may be located directly in front of the data D.

The data D is received from the POS peripherals 300 by operation S300.

The sizes of the header part H', the identification information part S, and the length part L' may be two bytes, one byte, and one byte, respectively. The size of the data D may be variable.

As mentioned above, as the POS peripherals controlling device 100 generates data for host transmission DP including various other information with the received data D and transmits it to the host device 200, instead of simply transmitting data D received from the POS peripherals 300, it is possible to allow the host device 200 to more accurately obtain necessary information on the POS peripherals 300.

The POS peripherals controlling device 100 may transmit the generated data for host transmission to the host device 200 in operation S340.

At this point, it is described above that the POS peripherals controlling device 100 processes the data for host transmission DP additionally and transmit it to the host device 200 according to a defined communication method for connecting the host device 200 and the POS peripherals controlling device 100.

(2) Data Reception of Host Device

As described with FIGS. 7 and 8, when the POS peripherals controlling device 100 transmits data for host transmission DP to the host device 200, the host device 100 may obtain necessary information on POS peripherals. Hereinafter, each operation of the host device 200 is described in detail.

FIG. 9 is a flowchart illustrating operations of the host device 200 during a series of procedures for transmitting data from POS peripherals to a host device according to an embodiment of the present invention.

Referring to FIG. 9, the host device 200 may perform receiving data from the POS peripherals controlling device 100 in operation S400, checking whether the received data is data for host transmission in operation S410, checking a source POS peripheral in operation S420 when the received data is the data for host transmission, calling a control unit corresponding to the checked source POS peripheral among at least one control unit in operation S430, and processing the received data through the called control unit in operation S440. Moreover, when the data received from the POS peripherals controlling device 100 is not data for host transmission, the host device 200 may perform an operation corresponding to the received data in operation S450.

The operations may be controlled by the controller 260 of the host device 200. Hereinafter, each operation will be described in detail.

The host device 200 may receive data from the POS peripherals controlling device 100 in operation S400.

When receiving data from the POS peripherals controlling device 100, the host device 200 may check whether the received data is data for host transmission DP in operation S410.

The host device 200 may check whether the received data is data for host transmission DP by checking the header part H' of the data received from the POS peripherals controlling device 100.

When the received data is data for host transmission DP, the host device 200 may check a source POS peripheral in operation S420.

The host device 200 may check the source POS peripheral on the basis of identification information of a source POS peripheral included in the identification information part S included in the received data for host transmission DP.

When the source POS peripheral is checked, the host device 200 may call a control unit corresponding to the checked source POS peripheral among at least one control unit in operation S430.

For example, when the checked source POS peripheral is a first POS peripheral (for example, a POS printer), a first control unit 2501 corresponding to the first POS peripheral may be called and when the checked source POS peripheral is a second POS peripheral (for example, a cash drawer), a second control unit 2502 corresponding to the second POS peripheral may be called.

The host device 200 may process received data through the called control unit in operation S440.

Especially, data processed in operation S440 may be data D transmitted from the source POS peripheral to the POS peripherals controlling device 100 among data included in the data for host transmission DP.

The data has a format that is processed by the source POS peripheral. That is, the data has a format dependent on the type of the source POS peripheral and data generated by a first POS peripheral may be processed by a first control unit corresponding to the first POS peripheral but data generated by the first POS peripheral cannot be processed by a second control unit not corresponding to the first POS peripheral.

According to an embodiment of the present invention, the host device 200 checks a source POS peripheral through operation S420, calls a control unit corresponding to the source POS peripheral through operation S430, and processes data received from the source POS peripheral, so that data received from the source POS peripheral may be processed properly.

Through operations S400 to S440, the host device 200 receives data transmitted from the POS peripherals 300 and accurately processes it and obtains data necessary for monitoring a state of the POS peripherals 300 and more properly controlling the POS peripherals 300.

Moreover, although not shown in the drawing, in order to notify a result processed through operation S440 to a user, the host device 200 may output it visually or audibly through the video output unit 242 or the audio output unit 241.

Alternatively, the host device 200 may notify a result processed through operation S440 to an application running on the host device 200 and/or an OS handling operations of the host device 200.

According to the present invention, as being connected to the POS peripherals controlling device, without a specific hardware design change or a special hardware component addition for an existing smartphone and/or a tablet PC, it is possible to operate as a host device for controlling POS peripherals.

Moreover, according to the present invention, without a specific hardware design change or a software design change for existing POS peripherals and/or a special hardware component or software component addition for existing POS peripherals, it is possible to communicate a POS peripherals controlling device through a method identical to a method of communicating with an existing host device, and as a POS peripherals controlling device according to an embodiment of the present invention properly serves as an intermediate role between a POS peripheral and a host device, even when an existing smartphone and/or a tablet PC is used as a host device, it is possible to communicate with various kinds of POS peripherals.

In relation to the control method according to the present invention, operations for configuring each embodiment are not essential and accordingly, each embodiment may selectively include the above-mentioned operations. Furthermore, each operation configuring each embodiment is not necessarily performed according to the described order and the operations described later may be performed first before the operations described earlier.

Additionally, a control method according to the present invention may be implemented in a code or program form for executing the same and such code or program may be stored in a computer readable recording medium.

The present invention described above, since a number of substitutions, modifications, and changes are possible by a person of ordinary skill in the art within the scope and spirit of the present invention is not limited to the above-mentioned embodiments and accompanying drawings. Additionally, the embodiments described in this specification are not limited to be applied and entire or part of each embodiment may be selectively combined and configured so that various modifications may be made. Furthermore, operations configuring each embodiment may be used separately or in combination of operations configuring another embodiment.

The invention claimed is:

1. A Point-Of-Sale (POS) peripherals controlling device comprising:
   a wireless communication unit;
   an interface part including at least one interface unit; and
   a controller determining whether data received from a mobile POS host device through the wireless communication unit includes control data for controlling at least one POS peripheral connected through the interface part, when the received data includes control data, checking a target POS peripheral where the control data is to be delivered among the at least one peripheral, and transmitting control data included in the received data to the checked POS peripheral through a first interface unit connected to the checked target POS peripheral among the at least one interface unit,
   wherein the control data is generated by the mobile POS host device and is generated in a format corresponding to the target POS peripheral that is to receive the control data, and
   wherein the data comprises a second part representing identification information of the target POS peripheral such that the POS peripherals controlling device transmits the control data to the target POS peripheral among the at least one POS peripheral.

2. The POS peripherals controlling device of claim 1, wherein the wireless communication unit communicates data through at least one wireless communication method of Wifi, Bluetooth, ZigBee, WiGig, Radio Frequency Identification (RFID), infrared Data Association (IrDA), Ultra Wideband (UWB), and WiHD.

3. The POS peripherals controlling device of claim 1, wherein the interface part comprises at least one of a USB port, a serial port, and a parallel port.

4. The POS peripherals controlling device of claim 1, wherein the interface part communicates data through at least one wireless communication method of Wifi, Bluetooth, ZigBee, WiGig, Radio Frequency Identification (RFID), infrared Data Association (IrDA), Ultra Wideband (UWB), and WiHD.

5. The POS peripherals controlling device of claim 1, wherein the data comprises a first part representing whether the data includes the control data, and a third part including the control data.

6. The POS peripherals controlling device of claim 5, wherein the third part comprises size information representing a size of the control data and the control data.

7. The POS peripherals controlling device of claim 1, wherein the controller determines whether the received data includes the control data on the basis of a first part included in the data and representing whether the data includes the control data.

8. The POS peripherals controlling device of claim 1, wherein the controller checks the target POS peripheral on the basis of a second part included in the data and representing identification information of the target POS peripheral.

9. The POS peripherals controlling device of claim 1, wherein the controller extracts the control data to be transmitted to the target POS peripheral from the received data on the basis of a third part included in the data and including size information representing a size of the control data and the control data.

10. A control method of a mobile host device that is wirelessly connected to a Point-Of-Sale (POS) peripherals controlling device that is connected to at least one POS peripheral, the method comprising:
    receiving a control signal for controlling a first POS peripheral among the at least one POS peripheral from an application program or Operating System (OS);
    generating control data having a format corresponding to the first POS peripheral on the basis of the control signal through a first unit corresponding to the first POS peripheral among at least one control unit;
    obtaining identification information of the first POS peripheral;
    generating data for controller transmission including the generated control data, and information representing data for controller transmission; and
    transmitting the generated data for controller transmission to the POS peripherals controlling device,
    wherein the data for controller transmission including the obtained identification information such that the POS peripherals controlling device transmits the control data to a first POS peripheral among the at least one POS peripheral.

11. The method of claim 10, wherein the data for controller transmission further comprises size information representing a size of the control data.

12. The method of claim 10, further comprising receiving identification information of the at least one POS peripheral from the POS peripherals controlling device.

13. A non-transitory computer readable recoding medium having recorded thereon a program for executing claim 10.

* * * * *